3,425,361
POWER AND FREE CONVEYOR TRANSFER SYSTEM

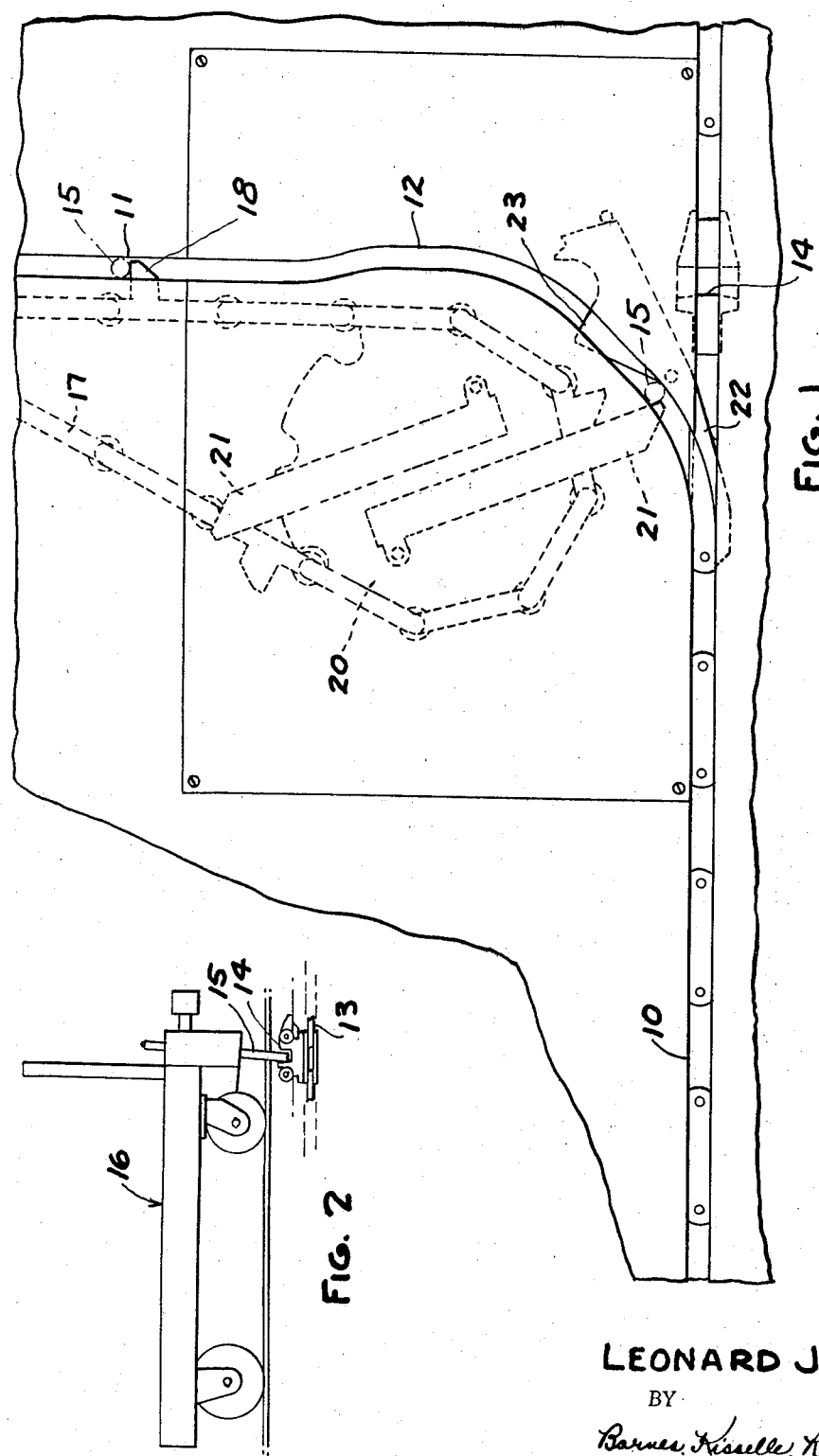

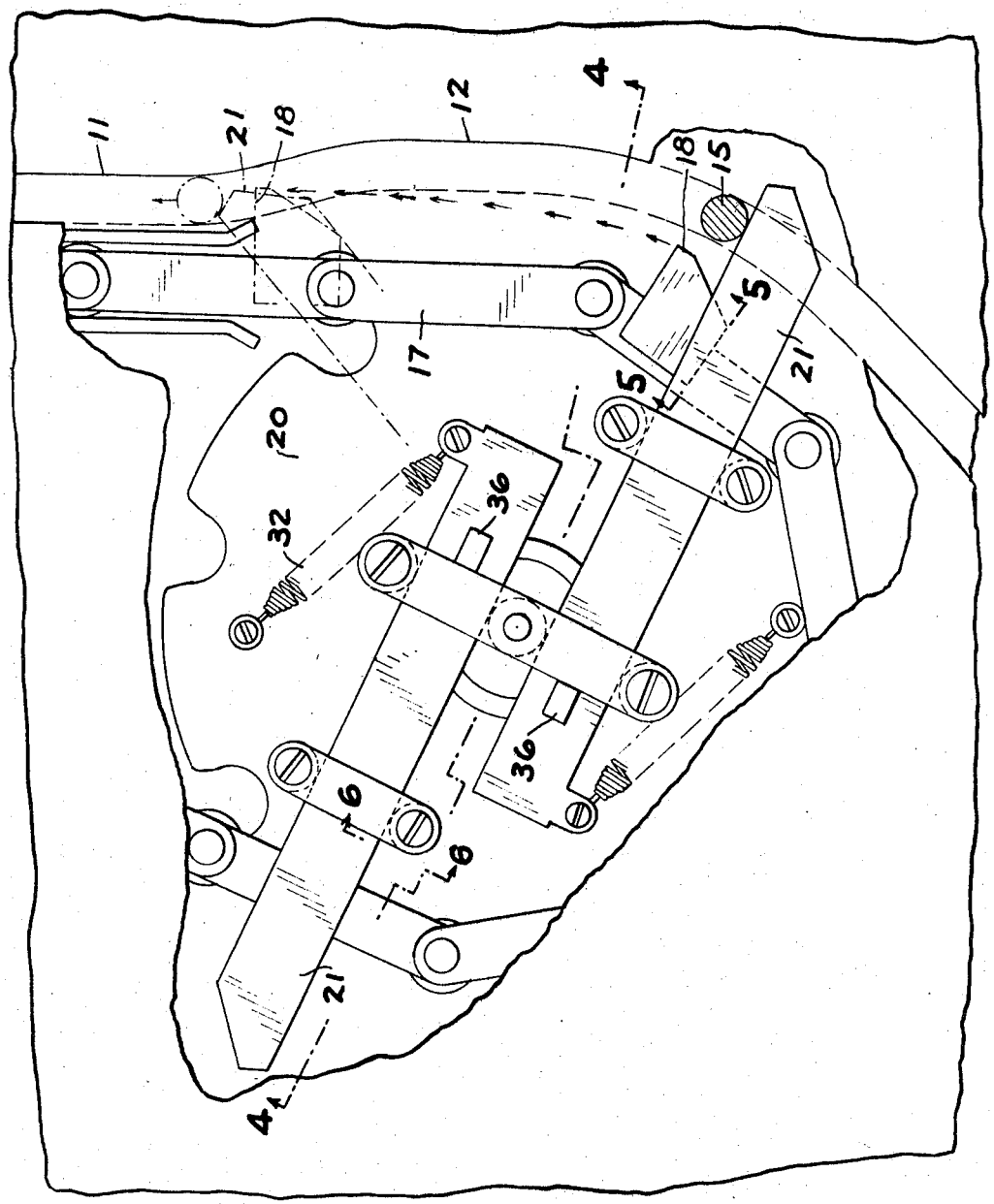

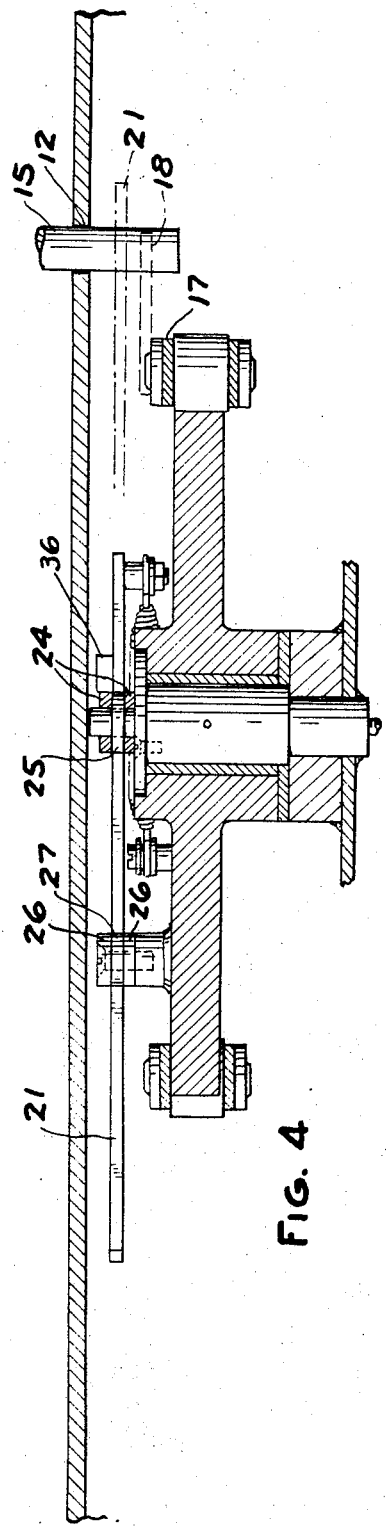

Leonard J. Bishop, Birmingham, Mich., assignor to Mechanical Handling Systems, Inc., Warren, Mich., a corporation of Michigan
Filed Aug. 29, 1966, Ser. No. 575,890
U.S. Cl. 104—172                  21 Claims
Int. Cl. B61b 9/00; B61j 3/04

---

ABSTRACT OF THE DISCLOSURE

A power and free conveyor system comprising a main track and main conveyor and a branch track and branch conveyor with a transfer zone between the main track and the branch track. A plurality of carriers are adapted to be engaged by means on the main and branch conveyors. A transfer device is provided for transferring a carrier from one of the main and branch conveyors to the other across the transfer zone. The transfer device comprises a rotatable member driven in timed relation to the conveyor to which the carrier is to be transferred. A plurality of radially extending arms are provided on the rotatable member. Each arm is supported for movement in a substantially straight line only.

---

This invention relates to power and free conveyors and particularly to a transfer system for power and free conveyors.

In power and free conveyors, it is conventional to have a main track, a branch track and a transfer zone between the main and branch track. Conveyors are provided along the main and branch track and in transferring carriers from one of the tracks to the other, a transfer mechanism is often provided.

Among the objects of the invention are to provide a transfer mechanism which is relatively simple, inexpensive, requires a minimum of maintenance and which will prevent jamming.

In the drawings:

FIG. 1 is a fragmentary plan view of a power and free conveyor system embodying the invention.

FIG. 2 is a fragmentary side elevational view of a tow truck being moved by the conveyor system.

FIG. 3 is a fragmentary plan view on a greatly enlarged scale, parts being broken away.

FIG. 4 is a fragmentary sectional view taken along the line 4—4 in FIG. 3.

FIG. 5 is a fragmentary sectional view taken along the line 5—5 in FIG. 3.

FIG. 6 is a fragmentary sectional view taken along the line 6—6 in FIG. 3.

FIG. 7 is a fragmentary sectional view taken along the line 7—7 in FIG. 6.

Referring to FIG. 1, the invention is shown and described in connection with a tow truck conveyor system which comprises a main track defined by a slot 10 in the floor, a branch track defined by a slot 11 in the floor and a transfer zone defined by a slot 12 that interconnects main slot 10 and branch slot 11. In accordance with well known construction, a main conveyor comprising a chain 13 having lugs 14 thereon is provided beneath the main slot 10 for engaging the tow pin 15 of a wheeled tow truck 16 to move the tow truck along the main slot 10. Similarly, a branch conveyor comprising a chain 17 with lugs 18 is provided with one reach thereof along the branch slot 11 for engaging the tow pin 15 and moving the tow truck along the branch track.

The branch conveyor chain 17 is trained over a sprocket 20 that is rotatably mounted beneath the floor and carries a plurality of generally radially extending transfer arms 21, the outer ends of which overlap portions of the transfer slot 12 to engage the tow pin 15 of the tow truck and transfer the tow truck from the main slot 10 to the branch slot 11 in the event that a switch tongue 22 is actuated in the path of the tow pin 15. The actuation of the switch tongue 22 can be manual or automatic in accordance with well known switching construction. As shown, the switch tongue 22 includes a reset cam portion 23 which is engaged by the tow pin and causes the switch tongue to be reset as the tow pin 15 is moved through the transfer slot 12.

Referring to FIGS. 3–7, each transfer arm 21 is mounted for movement along a straight line parallel to a radius of the sprocket 20. Specifically, vertically spaced guide bars 24 are supported on the sprocket 20 across the center thereof to define a slot 25 through which the arm 21 extends. Similarly, vertically spaced guide bars 26 are supported on the sprocket 20 to define a second slot 27 through which each arm extends. In order to insure free movement of the arm 21 through the aligned slots 25, 27, rollers are provided along the sides of the arms as shown in FIG. 7. Thus, for example, the bars 26 are spaced from one another by a spacer 28 through which a screw 29 extends into a support 30 on the sprocket 20. A roller 31 is rotatably mounted on each spacer 28. The arm 21 engages the rollers 31 so that the arm has free movement radially inwardly and outwardly. Each arm 21 is yieldingly urged outwardly by a tension spring 32 that is connected at one end to the arm and at the other to the sprocket as shown in FIG. 3. A stop 36 on each arm 21 engages the upper bar 24 to limit the outward movement of the arm 21.

In operation, as a carrier is being moved along the main conveyor by the main conveyor chain 13, if the switch tongue 22 is actuated, the tow pin is caused to move along the transfer slot 12. As sprocket 20 rotates and one of the transfer arms 21 is moved into position along the transfer slot 12, it will engage the tow pin 15 to move the tow pin 15 along the transfer slot 12 into position where a pusher lug 18 on the branch conveyor 17 will engage the tow pin and carry it along the branch slot 11. In the event that the arm 21 engages the tow pin 15 from the side, the arm 21 will be urged radially inwardly against the action of the spring 32 and jamming with resultant damage will be avoided As shown in FIG. 1, the width of the face of each pusher lug 14 on the main conveyor chain 13 is sufficiently great to insure that the tow pin 15 will be directed along the first portion of the transfer slot 11 into the path of the ends of the pusher arms 21.

Since the rotation of the transfer arms 21 is not in timed relation to the movement of the conveyor chain 13, there is a possibility that the transfer arm 21 might also engage the side of the pusher lugs 15. However, the yieldable mounting of each pusher arm 21 insures that any such contact will not result in any damage.

Since the tow pin 15 may drift forward into the transfer slot 12, in order to insure that the tow pin 15 will be engaged by a transfer arm 21 rather than by a pusher lug 18 on the branch conveyor, the position of the transfer slot 12 with respect to the path of the lugs 18 is such that the lugs 18 overlap the terminal portion of the transfer slot 12 only where the transfer slot 12 meets the branch slot 11. The terminal portion of the transfer slot 12 extends radially inwardly to the branch slot 11. The relative position of this terminal portion of the transfer slot 12, the pusher lugs 18 and transfer arms 21 in such that a pusher lug 18 substantially underlies the transfer arm 21 in the terminal portion of the transfer slot 12 and the transfer arm 21 leads the pusher lug 18 in the terminal portion. This insures that the transfer arm 21 will move the tow pin through the terminal portion of the transfer slot 12 into the branch slot 11 before pusher lug 18 achieves a position adjacent branch slot 11 where it will engage the tow pin and move it along the branch slot 11.

Although the invention has been described as being used for the transfer of carriers from a main track to a branch track, it is also applicable to the transfer from a branch track to a main track.

I claim:

1. In a power and free conveyor system, the combination comprising
   a main track,
   a main conveyor,
   a branch track,
   a branch conveyor,
   a transfer zone between the main track and the branch track,
   a plurality of carriers,
   each said carrier having means thereon adapted to be engaged by corresponding means on said main and branch conveyors,
   and a transfer device for transferring a carrier from one of said main and branch conveyors to the other across said transfer zone,
   said transfer device comprising a rotatable member driven in timed relation to said one of said main and branch conveyors to which the carrier is to be transferred,
   a plurality of generally radially extending arms on said rotatable member,
   means for supporting each said arm for movement in a substantially straight line only generally parallel to a radius of the rotatable member,
   and means yieldingly urging each said arm outwardly whereby the end of each said arm overlaps said transfer zone.

2. The combination set forth in claim 1 wherein said rotatable member comprises a sprocket over which the conveyor with which it is driven in timed relation is trained.

3. The combination set forth in claim 1 wherein said means for supporting each said arm for movement in a substantially straight line comprises longitudinally spaced pairs of bars defining aligned slots through which said arm extends.

4. The combination set forth in claim 3 wherein said means defining said slots comprises antifriction means engaging the sides of said arms.

5. The combination set forth in claim 4 wherein said antifriction means comprises rollers.

6. The combination set forth in claim 1 including means for limiting the radial outward movement of each said arm comprising a stop on said arm and a complementary stop on said rotatable member.

7. The combination set forth in claim 1 wherein said conveyor to which said carrier is being transferred includes pusher means thereon for engaging the carrier and moving it along the track,
   said transfer arms and said pusher means being so arranged circumferentially of the rotatable member that as the pusher means moves into position for engagement with the carrier along the track, a transfer arm is trailing the pusher means.

8. In a power and free conveyor system, the combination comprising
   a floor having a slot defining a main track,
   a main conveyor below said floor along said main slot,
   said floor having a slot defining a branch track,
   a branch conveyor below said floor along said branch slot,
   said floor having a slot connecting and defining a transfer zone between the main track slot and the branch track slot,
   a plurality of carriers,
   each said carrier having a tow pin thereon extending downwardly and adapted to be engaged by means on said main and branch conveyors,
   and a transfer device for transferring a carrier from one of said main and branch conveyors to the other across said transfer zone,
   said transfer device comprising a rotatable member driven in timed relation to said one of said main branch conveyors to which the carrier is to be transferred,
   a plurality of generally radially extending arms on said rotatable member,
   means for supporting each said arm for movement in a substantially straight line only generally parallel to a radius of the rotatable member,
   and means yielding urging each said arm outwardly whereby the end of each said arm overlaps said transfer zone.

9. The combination set forth in claim 8 wherein said rotatable member comprises a sprocket over which the conveyor with which it is driven in timed relation is trained.

10. The combination set forth in claim 8 wherein said means for supporting each said arm for movement in a substantially straight line comprises longitudinally spaced pairs of bars defining aligned slots through which said arm extends.

11. The combination set forth in claim 10 wherein said means defining said slots comprises antifriction means engaging the sides of said arms.

12. The combination set forth in claim 11 wherein said antifriction means comprises rollers.

13. The combination set forth in claim 10 including means for limiting the radial outward movement of each said arm comprising a stop on said arm and a complementary stop in one of said bars.

14. The combination set forth in claim 8 wherein said conveyor to which the carrier is being transferred includes pusher means thereon for engaging the tow pin of the carrier and moving it along the track,
   said transfer arms and said pusher means being so arranged circumferentially of the sprocket that as the pusher means moves into position for engagement with the carrier along the slot, a transfer arm is trailing the pusher means.

15. For use in a power and free conveyor system comprising a main track, a branch track, a conveyor along one of said tracks, a transfer zone between the main track and the branch track, and a plurality of carriers, each said carrier having means thereon adapted to be engaged by corresponding means on said branch conveyor, the improvement comprising
   a transfer device for transferring a carrier across said transfer zone to the track along which the conveyor extends,
   said transfer device comprising a rotatable member adapted to be driven in timed relation to said conveyors,
   a plurality of generally radially extending arms on said rotatable member,
   means for supporting each said arm for movement in a substantially straight line only generally parallel to a radius of the rotatable member,
   and means yieldingly urging each said arm outwardly whereby the end of each said arm overlaps said transfer zone.

16. The combination set forth in claim 15 wherein said rotatable member comprises a sprocket over which the conveyor is adapted to be trained.

17. The combination set forth in claim 15 wherein said means for supporting each said arm for movement in a substantially straight line comprises longitudinally spaced pairs of bars defining aligned slots through which said arm extends.

18. The combination set forth in claim 17 wherein said means defining said slots comprises antifriction means engaging the sides of said arms.

19. The combination set forth in claim 18 wherein said antifriction means comprises rollers.

20. The combination set forth in claim 15 including means for limiting the radial outward movement of each said arm comprising a stop on said arm and a complementary stop on said rotatable member.

21. In a power and free conveyor system, the combination comprising
- a floor having a slot defining a main track,
- a main conveyor below said floor along said main slot,
- said floor having a slot defining a branch track,
- a branch conveyor below said floor along said branch slot,
- said floor having a slot connecting and defining a transfer zone between the main track slot and the branch track slot,
- a plurality of carriers,
- each said carrier having a tow pin thereon extending downwardly and adapted to be engaged by means on said main and branch conveyors,
- and a transfer device for transferring a carrier from one of said main and branch conveyors to the other across said transfer zone,
- said transfer device comprising a rotatable member driven in timed relation to said one of said main branch conveyors to which the carrier is to be transferred,
- a plurality of generally radially extending arms on said rotatable member,
- said conveyor to which the carrier is being transferred including pusher means thereon for engaging the tow pin of the carrier and moving it along the track,
- said transfer arms and said pusher means being so arranged circumferentially of the sprocket that as a transfer arm is moving the tow pin along the first portion of the transfer slot, the pusher means moves in a path radially inwardly of the first portion of the transfer slot and as the tow pin is moved into the terminal portion of the transfer slot the pusher means moves into position for engagement with the carrier along the slot, the pusher means substantially underlies a transfer arm and trails the transfer arm slightly in said terminal portion to insure that the transfer arm will positively move the tow pin into the branch slot.

References Cited

UNITED STATES PATENTS

| | | | |
|---|---|---|---|
| 2,572,011 | 10/1951 | Cohen et al. | 104—172 |
| 2,875,704 | 3/1959 | Yates | 104—96 |
| 3,196,807 | 7/1965 | Etheridge | 104—172 |
| 3,230,896 | 1/1966 | Grant | 104—96 |
| 3,250,230 | 5/1966 | Pachuta | 104—172 |

ARTHUR L. LA POINT, *Primary Examiner.*

C. B. LYON, *Assistant Examiner.*

U.S. Cl. X.R.

104—178